United States Patent Office 2,825,729
Patented Mar. 4, 1958

2,825,729

ISOALLOXAZINES

Harold G. Petering, Kalamazoo, and Harry H. Fall, Kalamazoo Township, Kalamazoo County, Mich., assignors to The Upjohn Company, Kalamazoo, Mich., a corporation of Michigan No Drawing. Application May 24, 1955
Serial No. 510,870

17 Claims. (Cl. 260—251.5)

This invention relates to new and useful composition of matter, and is more particularly directed to isoalloxazines and to a method for the preparation of these compounds.

This application is a continuation-in-part of application Serial No. 364,191, filed June 25, 1953, now abandoned, and pending application Serial No. 454,628, filed September 7, 1954, now abandoned.

The novel compounds of the invention are esters of [ω-hydroxyalkyl]-isoalloxazines, otherwise referred to as isoalloxazinealkyl esters of phosphoric, sulfuric or an organic acid containing not more than eighteen carbon atoms. The esters are represented by the following general formula:

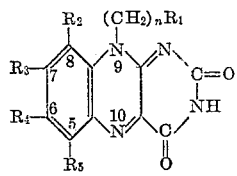

wherein $n$ is an integer from two to six inclusive, $R_1$ is a member selected from the group consisting of (a) an acyloxy radical, the acyl group of which is derived from an organic acid with not more than eighteen carbon atoms; (b) a sulfate radical; and (c) a phosphate radical; $R_3$ and $R_4$ are members selected from the group consisting of lower-alkyl, lower-alkoxy, amino, hydrogen, halo, and a polymethylene group linked to the aromatic ring to form a carbocyclic ring having six carbon atoms; $R_2$ and $R_5$ are members selected from the group consisting of hydrogen, lower-alkyl, lower-alkoxy, and amino, and wherein $R_2$, $R_3$, $R_4$ and $R_5$ when taken together, include not more than one amino group.

The terms "lower-alkyl" and "lower-alkoxy" as used herein include alkyl and alkoxy groups containing from one to five carbon atoms inclusive.

Sulfate and phosphate are generic terms referring respectively to the radicals obtained by removal of one or two atoms of hydrogen from sulfuric acid and to the radicals obtained by removal of one, two or three atoms of hydrogen from phosphoric acid.

It is an object of the present invention to provide novel compounds. Another object of this invention is to provide a process for the preparation of these compounds. Other objects of the invention will be apparent to those skilled in the art to which this invention pertains.

The novel compounds of the invention possess antimetabolite activity; for example, they are competitively active riboflavin antagonists. These compounds also exhibit anti-psittacosis activity.

The [ω-hydroxyalkyl]-isoalloxazine esters of the invention are characterized by unexpectedly superior antiriboflavin activity when compared with the corresponding [ω-hydroxyalkyl] - isoalloxazines. For example, antiriboflavin activity up to five times the magnitude possessed by the [ω-hydroxyalkyl]-isoalloxazine has been displayed by the corresponding ester compounds.

The isoalloxazine esters of the invention are obtained by reacting an [ω-hydroxyalkyl]-isoalloxazine, otherwise referred to as an isoalloxazinealkanol, of the formula:

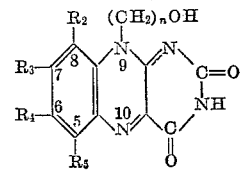

wherein $n$ is an integer from two to six inclusive, and $R_2$, $R_3$, $R_4$ and $R_5$ are as defined above, with an esterifying agent to obtain the corresponding isoalloxazinealkyl ester.

Conversion of an [ω-hydroxyalkyl]-isoalloxazine to the corresponding [ω-hydroxyalkyl]-isoalloxazine ester is achieved by a variety of procedures. In one method, the [ω-hydroxyalkyl]-isoalloxazine is refluxed with an excess of an organic acid in the presence of a catalyst such as hydrogen chloride, sulfuric acid, toluene sulfonic acid, or the like. A preferred procedure for the preparation of an [ω-hydroxyalkyl]-isoalloxazine ester embodies the alcoholysis of either an acid chloride or an acid anhydride of an inorganic acid such as sulfuric acid or phosphoric acid or an acid chloride or acid anhydride of an organic acid with not more than eighteen carbon atoms. The acid chlorides and acid anhydrides of the organic acid usually react more readily and rapidly with the [ω-hydroxyalkyl]-isoalloxazine in the presence of a basic material such as sodium carbonate or an organic tertiary amine such as pyridine. Acid chlorides and acid anhydrides which are used to esterify [ω-hydroxyalkyl]-isoalloxazine include acetic anhydride, acetyl chloride, propionyl chloride, propionic anhydride, benzoyl chloride, lauroyl chloride, succinic anhydride, succinyl chloride, or the like; a phosphoric acid chloride such as chlorophosphoric acid or phosphoryl chloride; or a sulfuric acid chloride such as chlorosulfonic acid or sulfuryl chloride.

The term "organic acid" as used herein includes both mono- and poly-carboxylic acids such as acetic acid, phenylacetic acid, propionic acid, cyclopentanepropionic acid, benzoic acid, lauric acid, myristic acid, stearic acid, oleic acid, p-aminobenzoic acid, salicylic acid, p-aminosalicylic acid, pimelic acid, succinic acid, glutamic acid, phthalic acid, pantoic acid, aspartic acid, adipic acid, glutaric acid, maleic acid, itaconic acid, citraconic acid, aconitic acid, suberic acid, tetradecanedioic acid, azelaic acid, dodecanedioic acid, sebacic acid, brassylic acid, thapsic acid, octadecanedioic acid, tetrapropyl succinic acid, n-tetradecyl succinic acid, α-aminoacetic acid, α-aminopropionic acid, β-aminopropionic acid; an alkane sulfonic acid such as methane sulfonic acid, ethane sulfonic acid, butane sulfonic acid, and the like; an aryl sulfonic acid such as benzene sulfonic acid, toluene sulfonic acid, naphthalene sulfonic acid, and the like; an alkane phosphonic acid such as methane phosphonic acid, ethane phosphonic acid, butane phosphonic acid, and the like; an aryl phosphonic acid such as benzene phosphonic acid, toluene phosphonic acid, naphthalene phosphonic acid, and the like. When the organic acids are polybasic, it is to be understood that unesterified acid groups can be neutralized by a base to form salts. The water-soluble salts such as the sodium, potassium, calcium, magnesium, and the like, i. e., alkali metal and alkaline earth metal salts, are particularly useful because of their high water-solubility which makes it possible to obtain concentrated preparations in infusion solutions or other suitable vehicles especially useful for parenteral, oral or topical administration. The preferred acids are the hydrocarbon carboxylic acids with not more than eighteen carbon atoms such as acetic acid, propionic acid, benzoic acid, succinic acid, lauric acid, myristic acid, and the like.

The starting [ω-hydroxyalkyl]-isoalloxazines are obtained by reacting a polyhydroxyalkylisoalloxazine of the formula:

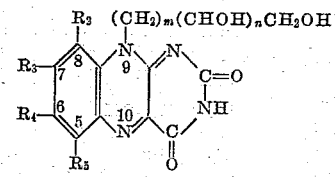

where in $R_2$, $R_3$, $R_4$ and $R_5$ are as defined above, $m$ is an integer from one to five inclusive, and $n$ is an integer from one to four inclusive, with not more than 2.5 times $n$ equivalents of an oxidizing agent such as periodic acid, lead tetraacetate, or the like, per mole of polyhydroxyalkylisoalloxazine, to produce the corresponding [ω-formylalkyl]-isoalloxazine of the formula:

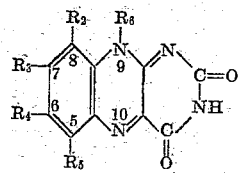

wherein $R_2$, $R_3$, $R_4$ and $R_5$ are as defined above and $R_6$ is an ω-formylalkyl group containing from two to six carbon atoms inclusive, and then reacting the [ω-formylalkyl]-isoalloxazine thus obtained with a reducing agent such as an alkali metal hydride to obtain the corresponding [ω-hydroxyalkyl]-isoalloxazine.

In the oxidation of a polyhydroxyalkylisoalloxazine to the corresponding formylalkylisoalloxazine with not more than 2.5 times $n$ equivalents of oxidizing agent per mole of polyhydroxyalkylisoalloxazine, as indicated supra, the term equivalent refers to the molecular weight of the oxidizing agent divided by the valence change of the oxidizing agent involved in the reaction.

The polyhydroxyalkylisoalloxazines are prepared by known methods. For example, in one method, a polyhydroxyalkylisoalloxazine is obtained by subjecting an N-monosubstituted aromatic ortho-diamine to condensation with an alloxan compound (Kuhn, Ber., 67, 1939, 1934; Karrer, Helv. Chim. Acta, 18, 69, 1935). The condensation of the N-monosubstituted aromatic ortho-diamine with alloxan or N-monosubstituted products thereof to produce the isoalloxazine is preferably performed in an acid solution, for instance, in the presence of a mineral acid such as hydrochloric, hydrobromic, sulfuric, nitric or phosphoric acid; but the condensation can also be carried out in a strong acetic acid solution, preferably by mixing the N-polyhydroxyalkyl aromatic ortho-diamine with a suspension of alloxan monohydrate and boric acid in glacial acetic acid, the desired isoalloxazine thus formed usually precipitating from the reaction mixture in substantially pure form.

Instead of using an N-monosubstituted aromatic ortho-diamine in the above-described condensation process, an N-monosubstituted aromatic ortho-nitroamine can be used as the starting material. The reduction of the ortho-nitroamine to the corresponding diamine and the subsequent condensation with alloxan can be carried out in a single step if the N-mono-substituted aromatic ortho-nitroamine is reacted with the alloxan compound in the presence of a reducing agent. Reducing agents which can be used include tin, stannous chloride, iron, trivalent titanium, and the like. A leuco compound of the isolloxazine compound is formed which is subsequently dehydrogenated by treatment with a dehydrogenating agent. Suitable dehydrogenating agents such as atmospheric oxygen, potassium permanganate, halogens, quinoid dyestuffs, and the like, can be used.

Isoalloxazines are also prepared by reacting ortho-aminoarylazo compounds of ring-substituted ortho-amino-arylazo compounds with barbituric acid in an acid medium (U. S. Patent 2,261,608).

Ortho-aminoarylazo compounds can also be condensed with alloxantin or dialuric acid to produce isoalloxazines in accordance with the procedure disclosed in U. S. Patent 2,374,661.

The starting aminoazo compounds are conveniently prepared by coupling substituted phenylamines containing alkyl, alkoxy, halo groups, and the like, with a diazotized amine in the manner described by Karrer, Helv. Chim. Acta, 18, 1130, 1935; 19, 264, 1936.

In another method used in the synthesis of isoalloxazines, the need for the above-indicated aminoazo compounds is eliminated since N-substituted aromatic amines such as ribityl or arabityl xylidine, and the like, or mineral salts thereof such as the hydrochlorides, or the like, can be condensed directly with violuric acid to yield isoalloxazines in a single step.

In another method, polyhydroxylated alkyl nitriles or their acyl derivatives can be reductively condensed with an aromatic amine to form the corresponding N-polyhydroxylated alkylamine or the acylated N-polyhydroxylated alkylamine, which compound can then be coupled with a diazonium salt, the resulting compound reduced to form the corresponding diamine and the diamine thus obtained condensed with alloxan to form an isoalloxazine (U. S. Patent 2,261,608).

The various 6,7 - dialkyl - 9 - polyhydroxyalkylisoalloxazines which are used in the preparation of 6,7-dialkyl-9-[ω-formylalkyl]-isoalloxazines can also be obtained according to the method of Karrer et al., Helv. Chim. Acta, 17, 1165, 1516, (1934).

A typical polyhydroxyalkylinoalloxazine, riboflavin, otherwise referred to as 6,7-dimethyl-9-(1′-D-ribityl)-isoalloxazine, was synthesized by Karrer, Helv. Chim. Acta, 18, 522–35, 1935, and Kuhn, Ber., 68, 1765–74, 1935. The basis of both the Kuhn and Karrer processes was the condensation of N - (3,4 - dimethyl - 6 - aminophenyl)-D-ribamine with alloxan to yield riboflavin. Karrer carried out the condensation in acid solution (U. S. Patents 2,155,555 and 2,237,074), whereas Kuhn materially increased the yield of that condensation by conducting it in glacial acetic acid solution with the use of boric acid as a catalyst (U. S. Patent 2,238,874 and Ber., 68, 1282, 1935). The N-(3,4-dimethyl-6-aminophenyl)-D-ribamine required for this condensation with alloxan was prepared by conventional methods such as: (1) condensation of 4-5-dinitro-o-xylene with D-ribamine followed by catalytic reduction, in an aqueous alcoholic solution, of the product thus obtained (Kuhn and Weygand, Ber., 68, 1001, 1935); or (2) condensation of 3,4-dimethyl-6-nitroaniline with D-ribose and reduction of the product thus obtained (Kuhn et al., Ber., 68, 1765, 1935; 70, 773, 1937); or (3), condensation of 3,4 - dimethyl - 6 - carbethoxyaminoaniline (Karrer et al., Helv. Chim. Acta, 18, 69, 1935; 18, 426, 1935) or 3,4 - dimethyl - 6 - acetylaminoaniline (Karrer et al., Ber., 68, 216, 1935) with D-ribose, reduction and saponification of the resulting compound to obtain the free amine, N - (3,4 - dimethyl - 6 - aminophenyl) - D-ribamine; or (4), condensation of 3,4-dimethylaniline with D-ribose, catalytic reduction of the resulting riboside to N - (3,4 - dimethylphenyl) - D - ribamine, coupling thereof with an aryl diazonium salt to form N-(3,4-dimethyl - 6 - arylazophenyl) - D - ribamine, and reduction of the compound thus-produced to form N-(3,4-dimethyl - 6 - aminophenyl) - D - ribamine (Karrer et al., Helv. Chim. Acta, 18, 1435, 1935).

Using the last-described procedure, other isoalloxazines, including those containing substituents in the 5, 6, 7 and 8 positions, can likewise be prepared. Thus, the [ω-formylalkyl]-isoalloxazines used in the preparation of the [ω-hydroxyalkyl]-isoalloxazines can be obtained by any of the procedures described supra or other conventional methods disclosed in the art.

The following preparations and examples are illustrative of the process and products of this invention but are not to be construed as limiting.

PREPARATION 1.—6,7-DIMETHYL-9-[β-HYDROXYETHYL]-ISOALLOXAZINE 28.4 grams (0.10 mole) of 6,7-dimethyl-9-formylmethylisoalloxazine, obtained by reacting 6,7-dimethyl-9-(1'-D-ribityl)-isoalloxazine (Karrer et al., Helv. Chim. Acta, 17, 1516, 1934) and periodic acid, is suspended in 250 milliliters of 0.4 N sodium hydroxide. (To prevent decomposition, the reaction mixture is shielded from light.) A solution of 3.7 grams (0.10 mole) of sodium borohydride in 25 milliliters of water is added thereto. An immediate reaction occurs as indicated by the formation of a greenish precipitate. After stirring for two hours, the mixture is cooled in an ice bath and the pH adjusted to pH 4.0 to pH 4.5 with glacial acetic acid. The solid material thus obtained is removed by filtration and then washed successively with acidified water, acetone and ether. After drying at a temperature of about sixty degrees centigrade, there is obtained 25.3 grams (88.4 percent yield) of a yellow solid, 6,7-dimethyl - 9 - [β - hydroxyethyl] - isoalloxazine, melting between 299 and 301 degrees centigrade, uncorrected.

PREPARATION 2.—6-ETHYL-7-METHYL-9-[β-HYDROXYETHYL]-ISOALLOXAZINE

Following the procedure described in Preparation 1 except for the substitution of 6,7-dimethyl-9-formylmethylisoalloxazine by 29.0 grams of 6-ethyl-7-methyl-9-formylmethylisoalloxazine (obtained by reacting 6-ethyl - 7 - methyl - 9 - (1' - D - ribityl) - isoalloxazine [Karrer and Quibell, Helv. Chim. Acta, 19, 1034, 1936] with periodic acid), 6 - ethyl - 7 - methyl - 9 - [β-hydroxyethyl]-isoalloxazine is obtained.

PREPARATION 3.—5,6-DIMETHYL-9-[β-HYDROXYETHYL]-ISOALLOXAZINE

Following the procedure described in Preparation 1 except for the substitution of 6,7-dimethyl-9-formylmethylisoalloxazine by 28.4 grams of 5,6-dimethyl-9-formylmethylisoalloxazine (obtained by reacting 5,6-dimethyl - 9 - (1' - D - ribityl) - isoalloxazine [Tishler et al., J. Am. Chem. Soc., 69, 1488, 1947] with periodic acid), 5,6 - dimethyl - 9 - [β - hydroxyethyl] - isoalloxazine is obtained.

PREPARATION 4.—7-METHYL-9-[β-HYDROXYETHYL]-ISOALLOXAZINE

Following the procedure described in Preparation 1 except for the substitution of 6,7-dimethyl-9-formylmethylisoalloxazine by 27.0 grams of 7-methyl-9-formylmethylisoalloxazine (obtained by reacting 7-methyl-9-(1'-D-ribityl)-isoalloxazine [Karrer and Quibell, Helv. Chim. Acta, 19, 1034, 1936] with periodic acid), 7-methyl - 9 - [β - hydroxyethyl] - isoalloxazine is obtained.

PREPARATION 5.—6,7-DICHLORO-9-[β-HYDROXYETHYL]-ISOALLOXAZINE

Following the procedure described in Preparation 1 except for the substitution of 6,7-dimethyl-9-formylmethylisoalloxazine by 32.5 grams of 6,7-dichloro-9-formylmethylisoalloxazine (obtained by reacting 6,7-dichloro - 9 - (1' - D - ribityl) - isoalloxazine [Weygand et al., Ber., 76, 1044, 1943] with periodic acid), 6,7-dichloro - 9 - [β - hydroxyethyl] - isoalloxazine is obtained.

PREPARATION 6.—6'7-DIMETHOXY-9-[β-HYDROXYETHYL]-ISOALLOXAZINE

Following the procedure described in Preparation 1 except for the substitution of 6,7-dimethyl-9-formylmethylisoalloxazine by 31.6 grams of 6,7-dimethoxy-9-formylmethylisoalloxazine (obtained by reacting 6,7-dimethoxy - 9 - (1' - L - arabityl) - isoalloxazine with periodic acid), 6,7 - dimethoxy - 9 - [β-hydroxyethyl]-isoalloxazine is obtained.

PREPARATION 7.—6,7-TETRAMETHYLENE-9-[β-HYDROXYETHYL]-ISOALLOXAZINE

Following the procedure described in Preparation 1 except for the substitution of 6,7-dimethyl-9-formylmethylisoalloxazine by 32.8 grams of 6,7-tetramethylene-9-formylmethylisoalloxazine (obtained by reacting 6,7-tetramethylene - 9 - (1' - D - arabityl) - isoalloxazine [Kuhn, Ber., 70, 1302, 1937] with periodic acid), 6,7-tetramethylene - 9 - [β - hydroxyethyl] - isoalloxazine is obtained.

PREPARATION 8.—6-METHYL-7-AMINO-9-[β-HYDROXYETHYL]-ISOALLOXAZINE

Following the procedure described in Preparation 1 except for the substitution of 6,7-dimethyl-9-formylmethylisoalloxazine by 28.5 grams of 6-methyl-7-amino-9-formylmethylisoalloxazine (obtained by reacting 6-methyl - 7 - amino - 9 - (1' - D - arabityl) - isoalloxazine [Nishida, Rpts. Sci. Res. Inst., Japan, 25, 323, 1949] with periodic acid), 6 - methyl - 7 - amino - 9 - [β-hydroxyethyl]-isoalloxazine is obtained.

PREPARATION 9.—6,7-DIMETHYL-9-[γ-HYDROXYPROPYL]-ISOALLOXAZINE

Following the procedure described in Preparation 1 except for the substitution of 6,7-dimethyl-9-formylmethylisoalloxazine by 29.8 grams of 6,7-dimethyl-9-[β-formylethyl]-isoalloxazine (obtained by reacting 6,7-dimethyl-9-(1'-D-desoxyribityl)-isoalloxazine [Karrer et al., Helv. Chim. Acta 18, 1144, 1935] with periodic acid), 6,7-dimethyl-9-[γ-hydroxypropyl]-isoalloxazine is obtained.

PREPARATION 10.—6,7-DIMETHYL-9-[δ-HYDROXYBUTYL]-ISOALLOXAZINE

Following the procedure described in Preparation 1 except for the substitution of 6,7-dimethyl-9-formylmethylisoalloxazine by 31.2 grams of 6,7-dimethyl-9-[γ-formylpropyl]-isoalloxazine (obtained by reacting 6,7-dimethyl-9-(4',5'-dihydroxyamyl)-isoalloxazine with periodic acid), 6,7-dimethyl - 9 - [δ-hydroxybutyl]-isoalloxazine is obtained.

PREPARATION 11.—6,7-DIETHYL-9-[β-HYDROXYETHYL]-ISOALLOXAZINE

Following the procedure described in Preparation 1 except for the substitution of 6,7-dimethyl-9-formylmethylisoalloxazine by 31.2 grams of 6,7-diethyl-9-formylmethylisoalloxazine (obtained by reacting 6,7-diethyl - 9 - (1'-D-ribityl) - isoalloxazine [Lambooy, J. Am. Chem. Soc., 72, 5225, 1950] with periodic acid), 6,7-diethyl-9-[β-hydroxyethyl]-isoalloxazine is obtained.

PREPARATION 12.—6-METHOXY-7-AMINO-9-[β-HYDROXYETHYL]-ISOALLOXAZINE

Following the procedure described in Preparation 1 except for the substitution of 6,7-dimethyl-9-formylmethylisoalloxazine by 30.1 grams of 6-methoxy-7-amino-9-formylmethylisoalloxazine (obtained by reacting 6-methoxy - 7 - amino - 9 - (1' - D - ribityl)-isoalloxazine with periodic acid), 6-methoxy-7-amino-9[β-hydroxyethyl]-isoalloxazine is obtained.

PREPARATION 13.—5,6,7,8-TETRAMETHYL-9-[β-HYDROXYETHYL]-ISOALLOXAZINE

Following the procedure described in Preparation 1 except for the substitution of 6,7-dimethyl-9-formylmethylisoalloxazine by 31.2 grams of 5,6,7,8-tetramethyl-9-formylmethylisoalloxazine (obtained by reacting 5,6,7,8-tetramethyl-9-(1'-L-arabityl)-isoalloxazine with periodic acid), 5,6,7,8-tetramethyl - 9 - [β-hydroxyethyl]-isoalloxazine is obtained.

PREPARATION 14.—6,7-DIBROMO-9-[β-HYDROXYETHYL]-ISOALLOXAZINE

Following the procedure described in Preparation 1 except for the substitution of 6,7-dimethyl-9-formylmethylisoalloxazine by 41.4 grams of 6,7-dibromo-9-formylmethylisoalloxazine (obtained by reacting 6,7-dibromo-9 - (1' - D - ribityl) - isoalloxazine [Weygand et al., Ber., 76, 1044, 1943] with periodic acid), 6,7-dibromo-9-[β-hydroxyethyl]-isoalloxazine is obtained.

PREPARATION 15.—5-METHOXY-6-AMINO-9-[β-HYDROXYETHYL]-ISOALLOXAZINE

Following the procedure described in Preparation 1 except for the substitution of 6,7-dimethyl-9-formylmethylisoalloxazine by 30.1 grams of 5-methoxy-6-amino-9-formylmethylisoalloxazine (obtained by reacting 5-methoxy - 6 - amino - 9 - (1' - D - ribityl) - isoalloxazine with periodic acid), 5-methoxy-6-amino-9-[β-hydroxyethyl]-isoalloxazine is obtained.

5 - methoxy - 6 - amino - 9 - (1' - D - ribityl) - isoalloxazine is obtained by condensing 3-amino-2,6-dinitroanisole (Reverdin and Widmer, Ber., 46, 4075) with ribose, reducing the resulting product to obtain 2,4-diamino-3-methoxy-N-ribitylaniline and then condensing the latter compound with alloxan.

PREPARATION 16.—5-AMINO-6-METHOXY-9-[β-HYDROXYETHYL]-ISOALLOXAZINE

Following the procedure described in Preparation 1 except for the substitution of 6,7-dimethyl-9-formylmethylisoalloxazine by 30.1 grams of 5-amino-6-methoxy-9-formylmethylisoalloxazine (obtained by reacting 5-amino-6 - methoxy - 9 - (1' - D - ribityl) - isoalloxazine with periodic acid), 5 - amino - 6 - methoxy - 9 - [β - hydroxyethyl]-isoalloxazine is obtained.

5 - amino - 6 - methoxy - 9 - (1' - D - ribityl) - isoalloxazine is obtained by condensing 4-amino-2,3-dinitroanisole [Reverdin and De Luc, Ber., 45, 353; 43, 3462] with ribose, reducing the resulting product to obtain 2,3-diamino-4-methoxy-N-ribitylaniline and condensing the latter compound with alloxan.

PREPARATION 17.—6-METHOXY-8-AMINO-9-[β-HYDROXYETHYL]-ISOALLOXAZINE

Following the procedure described in Preparation 1 except for the substitution of 6,7-dimethyl-9-formylmethylisoalloxazine by 30.1 grams of 6-methoxy-8-amino-9-formylmethylisoalloxazine (obtained by reacting 6-methoxy - 8 - amino - 9 - (1' - D - ribityl) - isoalloxazine with periodic acid), 6-methoxy-8-amino-9-[β-hydroxyethyl]-isoalloxazine is obtained.

6 - methoxy - 8 - amino - 9 - (1' - D - ribityl) - isoalloxazine is obtained by condensing 4-amino-3,5-dinitroanisole [Reverdin, Ber., 42, 1524] with ribose, reducing the resulting product to obtain 2,6-diamino-4-methoxy-N-ribitylaniline and then condensing the latter compound with alloxan.

PREPARATION 18.—6-AMINO-8-METHOXY-9-[β-HYDROXYETHYL]-ISOALLOXAZINE

Following the procedure described in Preparation 1 except for the substitution of 6,7-dimethyl-9-formylmethylisoalloxazine by 30.1 grams of 6-amino-8-methoxy-9-formylmethylisoalloxazine (obtained by reacting 6-amino-8 - methoxy - 9 - (1' - D - ribityl) - isoalloxazine with periodic acid), 6 - amino - 8 - methoxy - 9 - [β - hydroxyethyl]-isoalloxazine is obtained.

6 - amino - 8 - methoxy - 9 - (1' - D - ribityl) - isoalloxazine is obtained by condensing 2-amino-3,5-dinitroanisole [Medola and Hay, J. Chem. Soc., 91, 1477], with ribose, reducing the resulting product to obtain 2-methoxy-4,6-diamino-N-ribitylaniline and condensing the latter compound with alloxan.

PREPARATION 19.—9-[β-HYDROXYETHYL]-ISOALLOXAZINE

Following the procedure described in Preparation 1 except for the substitution of 6,7-dimethyl-9-formylmethylisoalloxazine by 25.6 grams of 9-formylmethylisoalloxazine (obtained by reacting 9-(1'-L-arabityl)-isoalloxazine [Kuhn et al., Ber., 76, 1044, 1943] with periodic acid), 9-[β-hydroxyethyl]-isoalloxazine is obtained.

PREPARATION 20.—6,7-DIMETHYL-9-[ζ-HYDROXYHEXYL]-ISOALLOXAZINE

Following the procedure described in Preparation 1 except for the substitution of 6,7-dimethyl-9-formylmethylisoalloxazine by 34.0 grams of 6,7-dimethyl-9-formylamylisoalloxazine (obtained by reacting 6,7-dimethyl-9-[1'-(6',7'-dihydroxyheptyl)]-isoalloxazine with periodic acid, 6,7-dimethyl-9-[ζ-hydroxyhexyl]-isoalloxazine is obtained.

Other [ω-hydroxyalkyl] - isoalloxazines are similarly prepared such as 9 - [γ - hydroxypropyl] - isoalloxazine, 9 - [δ - hydroxybutyl] - isoalloxazine, 9 - [ζ - hydroxyhexyl] - isoalloxazine, 6 - chloro - 9 - [β - hydroxyethyl] - isoalloxazine, 6 - methyl - 7 - chloro - 9 - [β - hydroxyethyl] - isoalloxazine, 6,8 - dimethyl - 9 - [β - hydroxyethyl] - isoalloxazine, 6,8 - dimethyl - 9 - [δ - hydroxybutyl] - isoalloxazine, 6 - methyl - 7 - ethyl - 9 - [β - hydroxyethyl] - isoalloxazine, 6 - methyl - 7 - propyl - 9 - [β - hydroxyethyl] - isoalloxazine, 6,7 - dimethyl - 9 - [ε - hydroxyamyl] - isoalloxazine, 6,7 - diethyl - 9 - [γ - hydroxypropyl] - isoalloxazine, 6,7 - diethyl - 9 - [ε - hydroxyamyl] - isoalloxazine, 6,7-diethoxy - 9 - [β - hydroxyethyl] - isoalloxazine, 6,7 - dipropyl - 9 - [β-hydroxyethyl] - isoalloxazine, 6,7 - dipropoxy - 9 - [β - hydroxyethyl] - isoalloxazine, 6 - amino - 7 - methoxy - 9 - [β - hydroxyethyl] - isoalloxazine, 6 - methyl - 7 - amino - 9 - [γ - hydroxypropyl] - isoalloxazine, 6,7 - dimethoxy - 9 - [δ - hydroxybutyl] - isoalloxazine, 6 - propyl - 7-methyl - 9 - [β - hydroxyethyl] - isoalloxazine, 6 - methyl - 7-propyl - 9 - [γ - hydroxypropyl] - isoalloxazine, 6,7 - diamyl - 9 - [β - hydroxyethyl] - isoalloxazine, 6 - methoxy-7-chloro - 9 - [β - hydroxyethyl] - isoalloxazine, 6 - methyl - 9 - [β - hydroxyethyl] - isoalloxazine, 6 - methyl - 9 - [ε - hydroxyamyl] - isoalloxazine, 7 - methyl - 9 - [β - hydroxyethyl] - isoalloxazine, 7 - ethyl - 9 - [β - hydroxyethyl] - isoalloxazine, 8 - methyl - 9 - [β - hydroxyethyl]-isoalloxazine, 6 - methyl - 8 - isopropyl - 9 - [β - hydroxyethyl] - isoalloxazine, 6,7 - dibutyl - 9 - [β - hydroxyethyl]-isoalloxazine, 6,7 - trimethylene - 9 - [β - hydroxyethyl] - isoalloxazine, 7,8 - dimethyl - 9 - [β-hydroxyethyl] - isoalloxazine, 6,8 - dimethoxy - 9 - [β - hydroxyethyl] - isoalloxazine, 5 - methyl - 8 - isopropyl - 9 - [β-hydroxyethyl] - isoalloxazine, 6 - chloro - 7,8 - dimethyl-9-[β - hydroxyethyl] - isoalloxazine, 5,6,7 - trimethyl - 9-[γ - hydroxypropyl] - isoalloxazine, 5,6,7 - trimethyl - 9-[β-hydroxyethyl] - isoalloxazine, 6,7,8-trimethyl - 9 - [β-hydroxyethyl] - isoalloxazine, 5,7 - dimethyl - 6 - methoxy-9 - [β - hydroxyethyl] - isoalloxazine, 5,7,8 - trimethyl-6 - amino - 9 - [β-hydroxyethyl] - isoalloxazine, 5,6,8-trimethyl - 7 - amino - 9 - [β - hydroxyethyl] - isoalloxazine, 5,6,7,8 - tetramethyl - 9 - [γ - hydroxypropyl]-isoalloxazine, 5,6,7-trimethyl - 8 - methoxy - 9 - [β - hydroxyethyl]-isoalloxazine, 6,8 - dimethoxy - 7 - methyl - 9 - [β-hydroxyethyl] - isoalloxazine, 6 - methoxy - 7,8 - dimethyl - 9 - [β - hydroxyethyl] - isoalloxazine, 5,7 - dimethyl-6-methoxy - 9 - [β - hydroxyethyl] - isoalloxazine, 5,8-dimethyl - 6,7 - diethoxy - 9 - [β - hydroxyethyl] - isoalloxazine, 5,6,8-trimethyl - 7 - amino - 9 - [γ - hydroxypropyl]-isoalloxazine, 7 - isobutyl - 9 - [β-hydroxyethyl] - isoalloxazine, 8 - isobutyl - 9 - [β - hydroxyethyl] - isoalloxazine, 8 - isobutyl - 9 - [β - hydroxyethyl] - isoalloxazine, 6 - isopropyl - 8 - methyl - 9 - [β - hydroxyethyl]-isoalloxazine, 5 - isopropyl - 8 - methyl - 9 - [β - hydroxyethyl] - isoalloxazine, and the like.

Example 1.—6,7-dimethyl-9-isoalloxazineethyl acetate

Fifty milliliters of dry pyridine is mixed with 2.9 grams (0.01 mole) of 6,7-dimethy-9-[β-hydroxyethyl]-isoalloxazine (Preparation 1). An excess, 1.56 grams (0.02 mole), of acetyl chloride is added, with stirring, to the mixture while it is cooled in an ice bath. The mixture is heated under reflux until all of the 6,7-dimethyl-9-[β-hydroxyethyl]-isoalloxazine is dissolved, at which time the reaction is substantially complete. The pyridine solution is cooled, diluted with twenty milliliters of ethanol, and then stirred vigorously. The solution is concentrated in vacuo to an oil which is dissolved in 25 milliliters of methanol. On adding 200 milliliters of ether, a precipitate is obtained which is then dried. The substantially pure 6,7-dimethyl-9-isoalloxazineethyl acetate thus obtained melts between 228 and 232 degrees uncorrected.

*Analysis.*—Calculated for $C_{16}H_{16}N_4O_4$:

|   | Calculated | Found |
|---|---|---|
| C | 58.5 | 58.4 |
| H | 4.9 | 4.9 |
| N | 17.1 | 16.7 |
| $CH_3CO$ | 13.1 | 14.3 |

Using acetic anhydride as the acylating agent instead of acetyl chloride as described above, 6,7-dimethyl-9-isoalloxazineethyl acetate is prepared in the following manner:

A mixture containing 28.6 grams of 6,7-dimethyl-9-[β-hydroxyethyl]-isoalloxazine (Preparation 1), 200 milliliters of acetic anhydride and 400 milliliters of pyridine is heated under reflux for one hour. At the end of this period of time, the dark solution thus obtained is filtered, while hot, through a Buchner funnel thereby removing unacetylated materials. On evaporating the filtrate to dryness, a blackish-green solid is obtained. The crude material is triturated with fifty milliliters of ethanol and the mixture is then filtered. The solid material is triturated again with fifty milliliters of ethanol and the mixture is filtered. The partially purified material is washed with a mixture of fifty milliliters of ethanol and fifty milliliters of ether followed by another wash with 100 milliliters of ether and the product is then dried. Substantially pure 6,7-dimethyl-9-isoalloxazineethyl acetate is thus obtained melting between 228 and 232 degrees centigrade.

Example 2.—6,7-dimethyl-9-isoalloxazineethyl dihydrogen phosphate

To 122.6 grams (0.8 mole) of phosphoryl chloride is added slowly, accompanied by stirring and cooling, 28.0 grams (1.6 moles) of water. The mixture is agitated until the evolution of hydrogen chloride appears complete at which time the solution is allowed to stand overnight. Stirring is resumed until the evolution of hydrogen chloride gas ceases.

A mixture of fifteen milliliters of chlorophosphoric acid [$(HO)_2POCl$] thus obtained and 5.0 grams of 6,7-dimethyl-9-[β-hydroxyethyl] - isoalloxazine (Preparation 1) is stirred until solution is complete (24 to 40 hours). Protection from light is maintained throughout the reaction. The solution is cooled in an ice-bath and the unreacted chlorophosphoric acid is destroyed by reacting it with sixty milliliters of methanol. On the addition of a mixture containing eighty milliliters of ether and eighty milliliters of hexane, a blackish, gummy residue is obtained. The mass is dissolved in 200 milliliters of cold methanol and 300 milliliters of ether is added thereto. A brownish-green solid is obtained. The solid is removed by centrifugation and redissolved in 200 milliliters of cold methanol. A brownish precipitate is obtained on the addition of 300 milliliters of ether. The mixture is centrifuged, the solid material is separated, washed thoroughly with ether and dried at a temperature of sixty degrees centigrade. The 6,7-dimethyl-9-isoalloxazineethyl dihydrogen phosphate thus obtained melts between 210 and 213 degrees centigrade, uncorrected.

Following the procedure described above except for the substitution of chlorophosphoric acid by dichlorophosphoric acid and the reaction of the latter compound with 6,7-dimethyl-9-[β-hydroxyethyl]-isoalloxazine, the corresponding di-[6,7-dimethyl-9-isoalloxazineethyl] hydrogen phosphate is obtained.

Similarly, by reacting phosphoryl chloride with 6,7-dimethyl-9-[β-hydroxyethyl]-isoalloxazine, tri-[6,7-dimethyl-9-isoalloxazineethyl] phosphate is obtained.

Example 3.—6,7-dimethyl-9-isoalloxazineethyl hydrogen sulfate

To 135 grams of sulfuryl chloride in a 300 milliliter Erlenmeyer flask cooled in an ice-bath, is added, with stirring, eighteen grams of water; a violent reaction occurs. The mixture is allowed to stand overnight.

Ten milliliters of chlorosulfonic ($HOSO_2Cl$) acid thus obtained is mixed with five grams of 6,7-dimethyl-9-[β-hydroxyethyl]-isoalloxazine (Preparation 1) and the resulting mixture is stirred, while protected from light. After standing for a period of 24 hours, the syrupy mass is cooled and 65 milliliters of methanol is added followed by the addition of 200 milliliters of ether to the resulting solution. The precipitate thus formed is removed by centrifugation and the solid material is dissolved in 200 milliliters of cold methanol. Three hundred milliliters of ether is added to the methanolic solution thereby forming a precipitate which is redissolved in 100 milliliters of methanol. On the addition of 200 milliliters of ether to the solution, a yellow-orange solid is obtained. The solid material is removed by centrifugation, washed thoroughly with ether and dried at a temperature of sixty degrees centigrade. The solid 6,7-dimethyl-9-isoalloxazineethyl hydrogen sulfate thus obtained melts between 223 and 225 degrees centigrade, uncorrected.

Similarly, by reacting sulfuryl chloride with 6,7-dimethyl-9 - [β - hydroxyethyl] - isoalloxazine, di - [6,7-dimethyl-9-isoalloxazineethyl] sulfate is obtained.

Example 4.—6,7-dimethyl-9-isoalloxazineethyl propionate

Fifty milliliters of dry pyridine is mixed with 2.9 grams (0.01 mole) of 6,7-dimethyl-9-[β-hydroxyethyl]-isoalloxazine (Preparation 1). An excess, 2.3 grams (0.025 mole), of propionyl chloride is added, with stirring, to the mixture, while cooling. The mixture is refluxed until the 6,7-dimethyl-9-[β-hydroxyethyl]-isoalloxazine dissolves, at which time the reaction is substantially complete. The pyridine solution is diluted with twenty milliliters of methanol, the solution is stirred vigorously and concentrated in vacuo to an oil. The resulting mass is then dissolved in 25 milliliters of ethanol. On the addition of 200 milliliters of ether, a precipitate is obtained. The solid material is dried and recrystallized to obtain substantially pure 6,7-dimethyl-9-isoalloxazineethyl propionate.

Example 5.—6,7-dimethyl-9-isoalloxazineethyl hydrogen succinate

A mixture of 3.8 grams of 6,7-dimethyl-9-[β-hydroxyethyl]-isoalloxazine (Preparation 1), 3.0 grams of succinic anhydride and 100 milliliters of pyridine is refluxed for one hour. The solution is cooled and 200 milliliters of ether is added thereto. The precipitate thus formed is dissolved in fifty milliliters of methanol and, on the addition of 200 milliliters of ether, a precipitate is obtained. The precipitate is redissolved in fifty milliliters of methanol and on the addition of 200 milliliters of ether, a precipitate is once again obtained. The solid material is washed successively with three 100-milliliter portions of hot acetone, fifty milliliters of ether and dried. The substantially pure, 6,7-dimethyl-9-isoalloxazineethyl hydrogen succinate thus obtained melts between 227 and 228 degrees centigrade, uncorrected.

Similarly, by reacting succinyl chloride with 6,7-dimethyl-9-[β-hydroxyethyl]-isoalloxazine, di-[6,7-dimethyl-9-isoalloxazineethyl] succinate is obtained.

Mixed succinate esters of 6,7-dimethyl-9-[β-hydroxyethyl]-isoalloxazine are obtained by treating succinic anhydride with an alkanol such as methanol, ethanol, butanol, or the like, to form the corresponding alkyl hydrogen succinate such as methyl hydrogen succinate, ethyl hydrogen succinate, butyl hydrogen succinate, or the like, reacting the resulting compound with thionyl chloride, and then reacting the compound thus obtained with 6,7-dimethyl-9-[β-hydroxyethyl]-isoalloxazine to obtain the corresponding 6,7-dimethyl-9-isoalloxazineethyl alkyl succinate such as 6,7-dimethyl-9-isoalloxazineethyl methyl succinate, 6,7-dimethyl-9-isoalloxazineethyl ethyl succinate, 6,7-dimethyl-9-isoalloxazineethyl butyl succinate, or the like.

*Example 6.—Sodium 6,7-dimethyl-9-isoalloxazineethyl succinate*

386 milligrams of 6,7-dimethyl-9-isoalloxazineethyl hydrogen succinate (Example 5) is dissolved in 9.0 milliliters of 0.1 N sodium hydroxide and the resulting solution is filtered. The filtrate is freeze-dried. There is obtained 400 milligrams of the sodium salt of 6,7-dimethyl-9-isoalloxazineethyl succinate. An aqueous solution of the product possesses a pH of about 7.0.

*Example 7.—Potassium 6,7-dimethyl-9-isoalloxazineethyl succinate*

Following the procedure described in Example 6 except for the replacement of sodium hydroxide by potassium hydroxide, there is obtained 400 milligrams of the potassium salt of 6,7-dimethyl-9-isoalloxazineethyl succinate.

*Example 8.—Calcium 6,7-dimethyl-9-isoalloxazineethyl succinate*

Following the procedure described in Example 6 except for the replacement of sodium hydroxide by calcium hydroxide, there is obtained 400 milligrams of the calcium salt of 6,7-dimethyl-9-isoalloxazineethyl succinate.

The above prepared sodium, potassium and calcium salts of 6,7-dimethyl-9-isoalloxazineethyl succinate are soluble in water and in buffers of a pH range between about 7.0 and about 8.0 to the extent of four to ten percent weight by volume. These salts are also readily soluble in five percent glucose and parenteral infusion solutions.

*Example 9.—6,7-dimethyl-9-isoalloxazineethyl hydrogen maleate*

A mixture of 3.8 grams of 6,7-dimethyl-9-[β-hydroxyethyl]-isoalloxazine (Preparation 1), 3.0 grams of maleic anhydride and 100 milliliters of pyridine is refluxed for one hour. The solution is cooled and on the addition of 200 milliliters of ether, a precipitate is formed. The precipitate is redissolved in fifty milliliters of methanol and on the addition of 200 milliliters of ether, a precipitate is once again formed. The solid material is washed successively with three 100-milliliter portions of hot acetone, fifty milliliters of ether and dried. There is obtained substantially pure 6,7-dimethyl-9-isoalloxazineethyl hydrogen maleate.

On reacting the 6,7-dimethyl-9-isoalloxazineethyl hydrogen maleate thus obtained with a suitable alkali metal base or alkaline earth metal base such as sodium hydroxide, potassium hydroxide, calcium hydroxide, and the like (using the procedure set forth in Example 6), the corresponding salt is obtained such as sodium 6,7-dimethyl-9-isoalloxazineethyl maleate, potassium 6,7-dimethyl-9-isoalloxazineethyl maleate, calcium 6,7-dimethyl-9-isoalloxazineethyl maleate, and the like.

Similarly, alkali metal and alkaline earth metal salts of isoalloxazinealkyl esters derived from polybasic acids of not more than eighteen carbon atoms can be prepared such as sodium 6,7-dimethyl-9-isoalloxazineethyl phthalate, potassium 6,7-dimethyl-9-isoalloxazineethyl phthalate, calcium 6,7-dimethyl-9-isoalloxazineethyl phthalate, sodium 6,7-dimethyl-9-isoalloxazineethyl glutamate, potassium 6,7-dimethyl-9-isoalloxazineethyl glutamate, calcium 6,7-dimethyl-9-isoalloxazineethyl glutamate, sodium 6,7-dimethyl-9-isoalloxazineethyl aspartate, potassium 6,7-dimethyl-9-isoalloxazineethyl aspartate, calcium 6,7-dimethyl-9-isoalloxazineethyl aspartate, sodium 6,7-dimethyl-9-isoalloxazineethyl adipate, potassium 6,7-dimethyl-9-isoalloxazineethyl adipate, sodium 6,7-dimethyl-9-isoalloxazineethyl itaconate, potassium 6,7-dimethyl-9-isoalloxazineethyl itaconate, sodium 6,7-dimethyl-9-isoalloxazineethyl citraconate, potassium 6,7-dimethyl-9-isoalloxazineethyl citraconate, and the like.

*Example 10.—6,7-dimethyl-9-isoalloxazineethyl benzoate*

A mixture of 286 milligrams (0.001 mole) of 6,7-dimethyl-9-[β-hydroxyethyl]-isoalloxazine (Preparation 1), 141 milligrams (0.001 mole) of benzoyl chloride and five milliliters of anhydrous pyridine is heated on a steam bath for one hour. A brownish solution is formed. The pyridine is removed by distillation and the residue is extracted with water and alcohol. On removal of the solvents by evaporation, 6,7-dimethyl-9-isoalloxazineethyl benzoate is obtained as a brown solid melting between 266 and 268 degrees centigrade, uncorrected.

*Example 11.—6,7-dimethyl-9-isoalloxazineethyl laurate*

A mixture of 500 milligrams of 6,7-dimethyl-9-[β-hydroxyethyl]-isoalloxazine (Preparation 1), and 5.0 milliliters of lauroyl chloride is stirred for two hours and then allowed to stand for an additional period of two hours. On the addition of an excess quantity of ether, a precipitate is formed. The solid material is removed by centrifuging, redissolved in cold methanol, reprecipitated by the addition of ether, centrifuged and air-dried, 6,7-dimethyl-9-isoalloxazineethyl laurate is obtained melting between 223 and 225 degrees centigrade, uncorrected.

*Example 12.—6,7-dimethyl-9-isoalloxazineethyl palmitate*

A mixture of 5.0 milliliters of palmitoyl chloride and 500 milligrams of 6,7-dimethyl-9-[β-hydroxyethyl]-isoalloxazine (Preparation 1) is stirred for nineteen hours while protected from light. Eighty milliliters of methanol is added to the mixture. The insoluble, unreacted 6,7-dimethyl-9-[β-hydroxyethyl]-isoalloxazine is removed from the solution by filtration. An excess quantity of ether is added to the mother liquor thereby forming a yellowish-brown solid material. The solid material is washed with ether and dried in air to obtain 6,7-dimethyl-9-isoalloxazineethyl palmitate in substantially pure form.

*Example 13.—6,7-dimethyl-9-isoalloxazineethyl cyclopentanepropionate*

A mixture of 500 milligrams of 6,7-dimethyl-9-[β-hydroxyethyl]-isoalloxazine (Preparation 1) and five milliliters of cyclopentanepropionyl chloride is stirred for nineteen hours while protected from light. An excess of methanol is added to the mixture and this is followed by the addition of an excess quantity of ether. The yellow-brown solid material thus obtained is separated by centrifugation, thoroughly washed with ether and dried in air. The product, 6,7-dimethyl-9-isoalloxazineethyl cyclopentanepropionate, melts between 198 and 202 degrees centigrade, uncorrected.

Similarly, other esters of 6,7-dimethyl-9-[β-hydroxyethyl]-isoalloxazine are prepared such as 6,7-dimethyl-9-isoalloxazineethyl salicylate, 6,7-dimethyl-9-isoalloxazineethyl hydrogen phthalate, di - [6,7 - dimethyl-9 - isoalloxazineethyl] phthalate, mixed phthalate esters of 6,7-dimethyl-9-[β-hydroxyethyl]-isoalloxazine such as 6,7-dimethyl-9-isoalloxazineethyl methyl phthalate, 6,7-dimethyl-9-isoalloxazineethyl ethyl phthalate, 6,7-dimethyl-9-isoalloxazineethyl butyl phthalate, and the like.

Example 14.—7-methyl-9-isoalloxazineethyl acetate

Following the procedure described in Example 1 except for the substitution of 6,7-dimethyl-9-[β-hydroxyethyl]-isoalloxazine by 2.7 grams of 7-methyl-9-[β-hydroxyethyl]-isoalloxazine (Preparation 4), 7-methyl-9-isoalloxazineethyl acetate is obtained.

Example 15.—7-methyl-9-isoalloxazineethyl hydrogen succinate

Following the procedure described in Example 5 except for the substitution of 6,7-dimethyl-9-[β-hydroxyethyl]-isoalloxazine by 3.0 grams of 7-methyl-9-[β-hydroxyethyl]-isoalloxazine (Preparation 4), 7-methyl-9-[β-hydroxyethyl]-isoalloxazineethyl hydrogen succinate is obtained.

Similarly, by reacting succinyl chloride with 7-methyl-9-[β-hydroxyethyl]-isoalloxazine, di-[7-methyl-9 - isoaloxazineethyl]-succinate is obtained.

Mixed succinate esters of 7-methyl-9-[β-hydroxyethyl]-isoalloxazine are obtained by treating succinic anhydride with an alkanol such as methanol, ethanol, butanol, and the like, to form the corresponding alkyl hydrogen succinate such as methyl hydrogen succinate, ethyl hydrogen succinate, butyl hydrogen succinate, and the like, reacting the resulting compound with thionyl chloride, and then reacting the compound thus obtained with 7-methyl-9-[β-hydroxyethyl]-isoalloxazine to obtain the corresponding 7-methyl-9-isoalloxazineethyl alkyl succinate such as 7-methyl-9-isoalloxazineethyl methyl succinate, 7-methyl-9-isoalloxazineethyl ethyl succinate, 7-methyl-9-isoalloxazineethyl butyl succinate, and the like.

Following the procedure described in Example 6 except for the substitution of 6,7-dimethyl-9-isoalloxazineethyl hydrogen succinate by 372 milligrams of 7-methyl-9-isoalloxazineethyl hydrogen succinate, there is obtained sodium 7-methyl-9-isoalloxazineethyl succinate.

Similiarly, on reacting 7-methyl-9-isoalloxazineethyl hydrogen succinate with potassium hydroxide, calcium hydroxide, or the like, the corresponding salt is obtained such as potassium 7-methyl-9-isoalloxazineethyl succinate, calcium 7-methyl-9-isoalloxazineethyl succinate, and the like.

Example 16.—7-methyl-9-isoalloxazineethyl dihydrogen phosphate

Following the procedure described in Example 2 except for the substitution of 6,7-dimethyl-9-[β hydroxyethyl]-isoalloxazine by 5.0 grams of 7-methyl-9-[β-hydroxyethyl]-isoalloxazine (Preparation 4), 7-methyl-9-isoalloxazineethyl dihydrogen phosphate is obtained.

Similarly, by reacting 7-methyl-9-[β-hydroxyethyl]-isoalloxazine with dichlorophosphoric acid, the corresponding di-[7-methyl-9-isoalloxazineethyl] hydrogen phosphate is obtained.

By reacting phosphoryl chloride with 7-methyl-9-[β-hydroxyethyl]-isoalloxazine, tri - [7 - methyl - 9 - isoalloxazineethyl] phosphate is obtained.

Similarly, other esters of 7-methyl-9-[β-hydroxyethyl]-isoalloxazine are prepared such as 7-methyl-9-isoalloxazine hydrogen sulfate, di-[7-methyl-9-isoalloxazineethyl] sulfate, 7-methyl-9-isoalloxazineethyl benzoate, 7-methyl-9-isoalloxazineethyl propionate, 7-methyl-9-isoalloxazineethyl hydrogen maleate, 7-methyl-9-isoalloxazineethyl hydrogen phthalate, 7-methyl-9-isoalloxazineethyl hydrogen glutamate, 7-methyl-9-isoalloxazineethyl hydrogen aspartate, 7-methyl-9-isoalloxazineethyl hydrogen glutarate, 7-methyl-9-isoalloxazineethyl hydrogen adipate, 7-methyl-9-isoalloxazineethyl hydrogen itaconate, and the like, including the alkali metal and alkaline earth metal salts thereof.

Example 17.—6-ethyl-7-methyl-9-isoalloxazineethyl acetate

Following the procedure described in Example 1 except for the substitution of 6,7-dimethyl-9-[β-hydroxyethyl]-isoalloxazine by 3.0 grams of 6-ethyl-7-methyl-9-[β-hydroxyethyl]-isoalloxazine (Preparation 2), 6-ethyl-7-methyl-9-isoalloxazineethyl acetate is obtained.

Example 18.—6-ethyl-7-methyl-9-isoalloxazineethyl dihydrogen phosphate

Following the procedure described in Example 2 except for the substitution of 6,7-dimethyl-9-[β-hydroxyethyl]-isoalloxazine by 5.0 grams of 6-ethyl-7-methyl-9-[β-hydroxyethyl]-isoalloxazine (Preparation 2), 6-ethyl-7-methyl-9-isoalloxazineethyl dihydrogen phosphate is obtained.

By reacting dichlorophosphoric acid with 6-ethyl-7-methyl-9-[β-hydroxyethyl]-isoalloxazine, the corresponding di-[6-ethyl-7-methyl-9-isoalloxazineethyl] hydrogen phosphate is obtained.

Similarly, by reacting phosphoryl chloride with 6-ethyl-7-methyl-9-[β-hydroxyethyl]-isoalloxazine, tri-[6-ethyl-7-methyl-9-isoalloxazineethyl] phosphate is obtained.

Example 19.—6-ethyl-7-methyl-9-isoalloxazineethyl hydrogen succinate

Following the procedure described in Example 5 except for the substitution of 6,7-dimethyl-9-[β-hydroxyethyl]-isoalloxazine by 4.0 grams of 6-ethyl-7-methyl-9-[β-hydroxyethyl]-isoalloxazine (Preparation 2), 6-ethyl-7-methyl-9-isoalloxazineethyl hydrogen succinate is obtained.

By reacting succinyl chloride with 6-ethyl-7-methyl-9-[β-hydroxyethyl] - isoalloxazine, di-[6-ethyl - 7-methyl-9-isoalloxazineethyl] succinate is obtained.

Mixed succinate esters of 6-ethyl-7-methyl-9-[β-hydroxyethyl]isoalloxazine are obtained by treating succinic anhydride with an alkanol such as methanol, ethanol, butanol, and the like, to form the corresponding alkyl hydrogen succinate such as methyl hydrogen succinate, ethyl hydrogen succinate, butyl hydrogen succinate, and the like, reacting the resulting compound with thionyl chloride, and then reacting the compound thus obtained with 6-ethyl-7-methyl-9-[β-hydroxyethyl]-isoalloxazine to obtain the corresponding 6-ethyl-7-methyl-9-isoalloxazineethyl methyl succinate, 6-ethyl-7-methyl-9-isoalloxazineethyl ethyl succinate, 6-ethyl-7-methyl-9-isoalloxazineethyl butyl succinate, and the like.

Following the procedure described in Example 6 except for the substitution of 6,7-dimethyl-9-isoalloxazineethyl hydrogen succinate by 400 milligrams of 6-ethyl-7-methyl-9-isoalloxazineethyl hydrogen succinate, there is obtained the sodium salt of 6-ethyl-7-methyl-9-isoalloxazineethyl hydrogen succinate.

In a similar manner, the potassium and calcium salts of 6-ethyl-7-methyl-9-isoalloxazineethyl succinate are obtained by reacting 6-ethyl-7-methyl-9-isoalloxazineethyl hydrogen succinate with potassium hydroxide and calcium hydroxide respectively.

Similarly, other esters of 6-ethyl-7-methyl-9-[β-hydroxyethyl]-isoalloxazine can be prepared such as 6-ethyl-7-methyl-9-isoalloxazineethyl hydrogen sulfate, di-[6-ethyl-7-methyl-9-isoalloxazineethyl] sulfate, 6-ethyl-7-methyl-9-isoalloxazineethyl laurate, 6-ethyl-7-methyl-9-isoalloxazineethyl propionate, 6-ethyl - 7 - methyl-9-isoalloxazineethyl hydrogen maleate, 6-ethyl-7-methyl-9-isoalloxazineethyl hydrogen phthalate, 6-ethyl-7-methyl-9-isoalloxazineethyl hydrogen glutamate, 6-ethyl-7-methyl-9-isoalloxazineethyl hydrogen aspartate, 6-ethyl-7-methyl-9-isoalloxazineethyl hydrogen glutarate, 6-ethyl-7-methyl-9-isoalloxazineethyl hydrogen adipate, 6-ethyl-7-methyl-9-isoalloxazineethyl hydrogen itaconate, and the like, including the alkali metal and alkaline earth metal salts thereof.

Example 20.—6,7-dichloro-9-isoalloxazineethyl acetate

Following the procedure described in Example 1 except for the substitution of 6,7-dimethyl-9-[β-hydroxyethyl]-isoalloxazine by 3.3 grams of 6,7-dichloro-9-[β-hydroxyethyl]-isoalloxazine (Preparation 5), 6,7-dichloro-9-isoalloxazineethyl acetate is obtained.

Example 21.—6,7-dichloro-9-isoalloxazineethyl dihydrogen phosphate

Following the procedure described in Example 2 except for the substitution of 6,7-dimethyl-9-[β-hydroxyethyl]-isoalloxazine by 5.0 grams of 6,7-dichloro-9-[β-hydroxyethyl]-isoalloxazine (Preparation 5), 6,7-dichloro-9-isoalloxazineethyl dihydrogen phosphate is obtained.

By reacting dichlorophosphoric acid with 6,7-dichloro-9-[β-hydroxyethyl]-isoalloxazine, the corresponding di-[6,7-dichloro-9-isoalloxazineethyl] hydrogen phosphate is obtained.

Similarly, by reacting phosphoryl chloride with 6,7-dichloro-9-[β-hydroxyethyl]-isoalloxazine, tri-[6,7-dichloro-9-isoalloxazineethyl] phosphate is obtained.

Example 22.—6,7-dichloro-9-isoalloxazineethyl hydrogen succinate

Following the procedure described in Example 5 except for the substitution of 6,7-dimethyl-9-[β-hydroxyethyl]-isoalloxazine by 4.4 grams of 6,7-dichloro-9-[β-hydroxyethyl]-isoalloxazine (Preparation 5), 6,7-dichloro-9-isoalloxazineethyl hydrogen succinate is obtained.

Similarly, by reacting succinyl chloride with 6,7-dichloro-9-[β-hydroxyethyl]-isoalloxazine, di-[6,7-dichloro-9-isoalloxazineethyl] succinate is obtained.

Mixed succinate esters of 6,7-dichloro-9-[β-hydroxyethyl]-isoalloxazine are obtained by treating succinic anhydride with an alkanol such as methanol, ethanol, butanol, and the like, to form the corresponding alkyl hydrogen succinate such as methyl hydrogen succinate, ethyl hydrogen succinate, butyl hydrogen succinate, and the like, reacting the resulting compound with thionyl chloride, and then reacting the compound thus obtained with 6,7-dichloro-9-[β-hydroxyethyl]-isoalloxazine to obtain the corresponding 6,7-dichloro-9-isoalloxazineethyl alkyl succinate such as 6,7-dichloro-9-isoalloxazineethyl methyl succinate, 6,7-dichloro-9-isoalloxazineethyl ethyl succinate, 6,7-dichloro-9-isoalloxazineethyl butyl succinate, and the like.

Following the procedure described in Example 6 except for the replacement of 6,7-dimethyl-9-isoalloxazineethyl hydrogen succinate by 427 milligrams of 6,7-dichloro-9-isoalloxazineethyl hydrogen succinate, there is obtained the sodium salt of 6,7-dichloro-9-isoalloxazineethyl hydrogen succinate.

In a similar manner, the potassium and calcium salts of 6,7-dichloro-9-isoalloxazineethyl succinate are obtained by reacting 6,7-dichloro-9-isoalloxazineethyl hydrogen succinate with potassium hydroxide and calcium hydroxide respectively.

Similarly, other esters of 6,7-dichloro-9-[β-hydroxyethyl]-isoalloxazine are prepared such as 6,7-dichloro-9-isoalloxazineethyl hydrogen sulfate, di-[6,7-dichloro-9-isoalloxazineethyl] sulfate, 6,7-dichloro-9-isoalloxazineethyl benzoate, 6,7-dichloro-9-isoalloxazineethyl propionate, 6,7-dichloro-9-isoalloxazineethyl hydrogen phthalate, di-[6,7-dichloro-9-isoalloxazineethyl]-phthalate, mixed phthalate esters such as, 6,7-dichloro-9-isoalloxazineethyl methyl phthalate, 6,7-dichloro-9-isoalloxazineethyl ethyl phthalate, 6,7-dichloro-9-isoalloxazineethyl butyl phthalate, 6,7-dichloro-9-isoalloxazineethyl hydrogen maleate, 6,7-dichloro-9-isoalloxazineethyl hydrogen glutamate, 6,7-dichloro-9-isoalloxazineethyl hydrogen aspartate, 6,7-dichloro-9-isoalloxazineethyl hydrogen glutarate, 6,7-dichloro-9-isoalloxazineethyl hydrogen adipate, 6,7-dichloro-9-isoalloxazineethyl hydrogen itaconate, and the like, including the alkali metal and alkaline earth metal salts thereof.

Example 23.—6-methyl-7-amino-9-isoalloxazineethyl acetate

Following the procedure described in Example 1 except for the substitution of pyridine by acetic acid and the replacement of 6,7-dimethyl-9-[β-hydroxyethyl]-isoalloxazine by 2.9 grams of 6-methyl-7-amino-9-[β-hydroxyethyl]-isoalloxazine hydrochloride (obtained by reacting 6-methyl-7-amino-9-[β-hydroxyethyl]-isoalloxazine [Preparation 8] with alcoholic hydrogen chloride), 6-methyl-7-amino-9-isoalloxazineethyl acetate hydrochloride is obtained. This is converted to 6-methyl-7-amino-9-isoalloxazineethyl acetate by treatment with an alkali or amine base.

Example 24.—6-methyl-7-amino-9-isoalloxazineethyl propionate

Following the procedure described in Example 4 except for the substitution of pyridine by propionic acid and the replacement of 6,7-dimethyl-9-[β-hydroxyethyl]-isoalloxazine by 5.0 grams of 6-methyl-7-amino-9-[β-hydroxyethyl]-isoalloxazine hydrochloride (obtained by reacting 6-methyl-7-amino-9-[β-hydroxyethyl]isoalloxazine [Preparation 8] with alcoholic hydrogen chloride), 6-methyl-7-amino-9-isoalloxazineethyl proprionate hydrochloride is obtained. This is converted to 6-methyl-7-amino-9-isoalloxazineethyl propionate by treatment with an alkali or amine base.

Example 25.—6,7-diethyl-9-isoalloxazineethyl acetate

Following the procedure described in Example 1 except for the substitution of 6,7-dimethyl-9-[β-hydroxyethyl]-isoalloxazine by 3.1 grams of 6,7-diethyl-9-[β-hydroxyethyl]-isoalloxazine (Preparation 11), 6,7-diethyl-9-isoalloxazineethyl acetate is obtained.

Example 26.—6,7-diethyl-9-isoalloxazineethyl propionate

Following the procedure described in Example 4 except for the substitution of 6,7-dimethyl-9-[β-hydroxyethyl]-isoalloxazine by 3.1 grams of 6,7-diethyl-9-[β-hydroxyethyl]-isoalloxazine (Preparation 11), 6,7-diethyl-9-isoalloxazineethyl propionate is obtained.

Similarly, other esters of 6,7-diethyl-9-[β-hydroxyethyl]-isoalloxazine are prepared such as 6,7-diethyl-9-isoalloxazineethyl hydrogen sulfate, di-[6,7-diethyl-9-isoalloxazineethyl] sulfate, 6,7-diethyl-9-isoalloxazineethyl benzoate, 6,7-diethyl-9-isoalloxazineethyl laurate, 6,7-diethyl-9-isoalloxazineethyl dihydrogen phosphate, di-[6,7-diethyl-9-isoalloxazineethyl] hydrogen phosphate, tri-[6,7-diethyl-9-isoalloxazineethyl] phosphate, and the like.

Example 27.—6,7-dimethyl-9-isoalloxazinepropyl acetate

Following the procedure described in Example 1 except for the substitution of 6,7-dimethyl-9-[β-hydroxyethyl]-isoalloxazine by 3.0 grams of 6,7-dimethyl-9-[γ-hydroxypropyl]-isoalloxazine (Preparation 9), 6,7-dimethyl-9-isoalloxazinepropyl acetate is obtained.

Example 28.—6,7-dimethyl-9-isoalloxazinepropyl dihydrogen phosphate

Following the procedure described in Example 2 except for the substitution of 6,7-dimethyl-9-[β-hydroxyethyl]-isoalloxazine by 5.0 grams of 6,7-dimethyl-9-[γ-hydroxypropyl]-isoalloxazine (Preparation 9), 6,7-dimethyl-9-isoalloxazinepropyl dihydrogen phosphate is obtained.

By reacting dichlorophosphoric acid with 6,7-dimethyl-9-[γ-hydroxypropyl]-isoalloxazine, the corresponding di-[6,7-dimethyl-9-isoalloxazinepropyl] hydrogen phosphate is obtained.

Similarly, by reacting phosphoryl chloride with 6,7-dimethyl-9-[γ-hydroxypropyl]-isoalloxazine, tri-[6,7-dimethyl-9-iso-alloxazinepropyl] phosphate is obtained.

Example 29.—6,7-dimethyl-9-isoalloxazinepropyl hydrogen succinate

Following the procedure described in Example 5 except for the substitution of 6,7-dimethyl-9-[β-hydroxyethyl]-isoalloxazine by 4.0 grams of 6,7-dimethyl-9-[γ-hydroxypropyl]-isoalloxazine (Preparation 9), 6,7- dimethyl-9-isoalloxazinepropyl hydrogen succinate is obtained.

Similarly, by reacting succinyl chloride with 6,7-dimethyl-9 - [γ-hydroxypropyl] - isoalloxazine, di-[6,7-dimethyl-9-isoalloxazinepropyl] succinate is obtained.

Mixed succinate esters of 6,7-dimethyl-9-[γ-hydroxypropyl]-isoalloxazine are obtained by treating succinic anhydride with an alkanol such as methanol, ethanol, butanol, and the like, to form the corresponding alkyl hydrogen succinate, such as methyl hydrogen succinate, ethyl hydrogen succinate, butyl hydrogen succinate, and the like, reacting the resulting compound with thionyl chloride, and then reacting the compound thus obtained with 6,7-dimethyl-9-[γ-hydroxypropyl]-isoalloxazine to obtain the corresponding 6,7-dimethyl-9-isoalloxazinepropyl alkyl succinate such as 6,7-dimethyl-9-isoalloxazine propyl methyl succinate, 6,7-dimethyl-9-isoalloxazinepropyl ethyl succinate, 6,7-dimethyl-9-isoalloxazinepropyl butyl succinate, and the like.

Following the procedure described in Example 6 except for the substitution of 6,7-dimethyl-9-isoalloxazineethyl hydrogen succinate by 400 milligrams of 6,7-dimethyl-9-isoalloxazinepropyl hydrogen succinate, there is obtained the sodium salt of 6,7-dimethyl-9-isoalloxazinepropyl succinate.

In a similar manner, on reacting 6,7-dimethyl-9-isoalloxazinepropyl hydrogen succinate with potassium hydroxide or calcium hydroxide, there is obtained the corresponding potassium or calcium salt of 6,7-dimethyl-9-isoalloxazinepropyl succinate.

In the same manner, other esters of 6,7-dimethyl-9-[γ-hydroxypropyl]-isoalloxazine are prepared such as 6,7-dimethyl-9-isoalloxazinepropyl propionate, 6,7-dimethyl-9-isoalloxazinepropyl hydrogen sulfate, di-[6,7-dimethyl-9-isoalloxazinepropyl] sulfate, 6,7-dimethyl-9-isoalloxazinepropyl benzoate, 6,7-dimethyl-9-isoalloxazinepropyl myristate, 6,7-dimethyl-9-isoalloxazinepropyl hydrogen maleate, 6,7 - dimethyl - 9 - isoalloxazinepropyl hydrogen glutamate, 6,7 - dimethyl - 9 - isoalloxazinepropyl hydrogen aspartate, 6,7-dimethyl-9-isoalloxazinepropyl hydrogen glutarate, 6,7-dimethyl-9-isoalloxazinepropyl hydrogen adipate, 6,7-dimethyl-9-isoalloxazinepropyl hydrogen itaconate, and the like, including alkali metal and alkaline earth metal salts thereof.

*Example 30.—6,7-dimethoxy-9-isoalloxazineethyl acetate*

Following the procedure described in Example 1 except for the substitution of 6,7-dimethyl-9-[β-hydroxyethyl]-isoalloxazine by 31.8 grams of 6,7-dimethoxy-9-[β-hydroxyethyl]-isoalloxazine (Preparation 6), 6,7-dimethoxy-9-isoalloxazineethyl acetate is obtained.

*Example 31.—6,7-tetramethylene-9-isoalloxazineethyl propionate*

Following the procedure described in Example 4 except for the substitution of 6,7-dimethyl-9-[β-hydroxyethyl]-isoalloxazine by 31.2 grams of 6,7-tetramethylene-9-[β-hydroxyethyl]-isoalloxazine (Preparation 7), 6,7-tetramethylene-9-isoalloxazineethyl propionate is obtained.

*Example 32.—6,7-dibromo-9-isoalloxazineethyl acetate*

Following the procedure described in Example 1 except for the substitution of 6,7-dimethyl-9-[β-hydroxyethyl]-isoalloxazine by 41.6 grams of 6.7-dibromo-9-[β-hydroxyethyl]-isoalloxazine (Preparation 14), 6,7-dibromo-9-isoalloxazineethyl acetate is obtained.

*Example 33.—5-methoxy-6-amino-9-isoalloxazineethyl propionate*

Following the procedure described in Example 4 except for the substitution of pyridine by propionic acid and the replacement of 6,7-dimethyl-9-[β-hydroxyethyl]-isoalloxazine by 30.3 grams of 5-methoxy-6-amino-9-[β-hydroxyethyl]-isoalloxazine hydrochloride (obtained by reacting 5-methoxy-6-amino-9-[β-hydroxyethyl]-isoalloxazine [Preparation 15] with alcoholic hydrogen chloride), 5-methoxy-6-amino-9-isoalloxazineethyl propionate hydrochloride is obtained. This is converted to 5-methoxy-6-amino-9-isoalloxazineethyl propionate by treatment with an alkali or amine base.

*Example 34.—5,6-dimethyl-9-isoalloxazineethyl acetate*

Following the procedure described in Example 1 except for the substitution of 6,7-dimethyl-9-[β-hydroxyethyl]-isoalloxazine by 28.6 grams of 5,6-dimethyl-9-[β-hydroxyethyl]-isoalloxazine (Preparation 3), 5,6-dimethyl-9-isoalloxazineethyl acetate is obtained.

*Example 35.—6,7-dimethyl-9-isoalloxazinebutyl acetate*

Following the procedure described in Example 1 except for the substitution of 6,7-dimethyl-9-[β-hydroxyethyl]-isoalloxazine by 31.4 grams of 6,7-dimethyl-9-[δ-hydroxybutyl]-isoalloxazine (Preparation 10), 6,7-dimethyl-9-isoalloxazinebutyl acetate is obtained.

*Example 36.—6-methoxy-7-amino-9-isoalloxazineethyl acetate*

Following the procedure described in Example 1 except for the substitution of pyridine by acetic acid and the replacement of 6,7-dimethyl-9-[β-hydroxyethyl]-isoalloxazine by 30.3 grams of 6-methoxy-7-amino-9-[β-hydroxyethyl]-isoalloxazine hydrochloride (obtained by reacting 6 - methoxy - 7 - amino - 9 - [β - hydroxyethyl]-isoalloxazine [Preparation 12] with alcoholic hydrogen chloride), 6-methoxy-7-amino-9-isoalloxazineethyl acetate hydrochloride is obtained. This is converted to 6-methoxy-7-amino-9-isoalloxazineethyl acetate by treatment with an alkali or amine base.

*Example 37.—5,6,7,8-tetramethyl-9-isoalloxazineethyl acetate*

Following the procedure described in Example 1 except for the substitution of 6,7-dimethyl-9-[β-hydroxyethyl]-isoalloxazine by 31.4 grams of 5,6,7,8-tetramethyl-9-[β-hydroxyethyl]-isoalloxazine (Preparation 13), 5,6,7,8-tetramethyl-9-isoalloxazineethyl acetate is obtained.

*Example 38.—5-amino-6-methoxy-9-isoalloxazineethyl acetate*

Following the procedure described in Example 1 except for the substitution of pyridine by acetic acid and the replacement of 6,7-dimethyl-9-[β-hydroxyethyl]-isoalloxazine by 30.3 grams of 5-amino-6-methoxy-9-[β-hydroxyethyl]-isoalloxazine hydrochloride (obtained by reacting 5 - amino - 6 - methoxy - 9 - [β - hydroxyethyl] - isoalloxazine [Preparation 16] with alcoholic hydrogen chloride), 5-amino-6-methoxy-9-isoalloxazineethyl acetate hydrochloride is obtained. This is converted to 5-amino-6-methoxy-9-isoalloxazineethyl acetate by treatment with an alkali or amine base.

*Example 39.—6-methoxy-8-amino-9-isoalloxazineethyl acetate*

Following the procedure described in Example 1 except for the substitution of pyridine by acetic acid and the replacement of 6,7-dimethyl-9-[β-hydroxyethyl]-isoalloxazine by 30.3 grams of 6-methoxy-8-amino-9-[β-hydroxyethyl]-isoalloxazine hydrochloride (obtained by reacting 6 - methoxy - 8 - amino - 9 - [β - hydroxyethyl] - isoalloxazine [Preparation 17] with alcoholic hydrogen chloride), 6-methoxy-8-amino-9-isoalloxazineethyl acetate hydrochloride is obtained. This is converted to 6-methoxy-8-amino-9-isoalloxazineethyl acetate by treatment with an alkali or amine base.

*Example 40.—6-amino-8-methoxy-9-isoalloxazineethyl acetate*

Following the procedure described in Example 1 except for the substitution of pyridine by acetic acid and the replacement of 6,7-dimethyl-9-[β-hydroxyethyl]-isoalloxazine by 30.3 grams of 6-amino-8-methoxy-9-[β-hydroxyethyl]-isoalloxazine hydrochloride (obtained by reacting 6-amino-8-methoxy-9-[β-hydroxyethyl]-isoalloxazine [Preparation 18] with alcoholic hydrogen chloride), 6-amino-8-methoxy-9-isoalloxazineethyl acetate hydrochloride is obtained. This is converted to 6-amino-8-methoxy-9-isoalloxazineethyl acetate by treatment with an alkali or amine base.

*Example 41.—9-isoalloxazineethyl acetate*

Following the procedure described in Example 1 except for the substitution of 6,7-dimethyl[β-hydroxyethyl]-isoalloxazine by 25.8 grams of 9-[β-hydroxyethyl]isoalloxazine (Preparation 19) 9-isoalloxazineethyl acetate is obtained.

*Example 42.—6,7-dimethyl-9-isoalloxazinehexyl acetate*

Following the procedure described in Example 1 except for the substitution of 6,7-dimethyl-9-[β-hydroxyethyl]-isoalloxazine by 34.2 grams of 6,7-dimethyl-9-[ξ-hydroxyhexyl]-isoalloxazine (Preparation 20), 6,7-dimethyl-9-isoalloxazinehexyl acetate is obtained.

Similarly, other esters of [ω-hydroxyalkyl]-isoalloxazines are prepared such as 9-isoalloxazinepropyl acetate, 9-isoalloxazine propyl benzoate, 9-isoalloxazinebutyl laurate, 9-isoalloxazinehexyl propionate, 9-isoalloxazineethyl hydrogen succinate, 9-isoalloxazineethyl hydrogen maleate, 6-chloro-9-isoalloxazineethyl acetate, 6-chloro-9-isoalloxazineethyl dihydrogen phosphate, 6-chloro-9-isoalloxazineethyl hydrogen succinate, 6-chloro-9-isoalloxazineethyl hydrogen glutamate, 6-methyl-7-chloro-9-isoalloxazineethyl acetate, 6-methyl-7-chloro-9-isoalloxazineethyl hydrogen succinate, 6,8-dimethyl-9-isoalloxazineethyl acetate, 6,8-dimethyl-9-isoalloxazineethyl hydrogen succinate, 6,8 - dimethyl - 9 - isoalloxazinebutyl acetate, 6-methyl-7-ethyl-9-isoalloxazineethyl dihydrogen phosphate, 6-methyl-7-propyl-9-isoalloxazineethyl hydrogen succinate, 6,7-dimethyl-9-isoalloxazineamyl acetate, 6,7-dimethyl-9-isoalloxazineamyl hydrogen succinate, 6,7-diethyl-9-isoalloxazinepropyl acetate, 6,7-diethyl-9-isoalloxazineamyl acetate, 6,7 - diethoxy - 9 - isoalloxazineethyl hydrogen succinate, 6,7 - dipropyl - 9 - isoalloxazineethyl acetate, 6,7 - dipropoxy - 9 - isoalloxazineethyl acetate, 6-amino-7-methoxy-9-isoalloxazineethyl acetate, 6-methyl-7-amino-9-isoalloxazinepropyl acetate, 6-methyl-7-amino-9-isoalloxazinepropyl hydrogen succinate, 6,7-dimethoxy-9-isoalloxazinebutyl dihydrogen phosphate, 6-propyl-7-methyl - 9 - isoalloxazineethyl acetate, 6-propyl-7-methyl-9-isoalloxazineethyl hydrogen succinate, 6-methyl-7-propyl-9-isoalloxazinepropyl dihydrogen phosphate, 6,7-diamyl-9-isoalloxazineethyl acetate, 6-methoxy-7-chloro-9-isoalloxazineethyl acetate, 6-methyl-9-isoalloxazineethyl benzoate, 6-methyl-9-isoalloxazineamyl acetate, 7-ethyl-9-isoalloxazineethyl acetate, 7-ethyl-9-isoalloxazineethyl hydrogen glutarate, 7-ethyl-9-isoalloxazineethyl propionate, 7-ethyl-9-isoalloxazineethyl hydrogen succinate, 8-methyl-9-isoalloxazineethyl acetate, 6-methoxy-7-chloro-9-isoalloxazineethyl acetate, 6-methyl-8-isopropyl-9-isoalloxazineethyl dihydrogen phosphate, 6-methyl-8-isopropyl-9-isoalloxazineethyl hydrogen succinate, 6,7-dibutyl-9-isoalloxazine dihydrogen phosphate, 6,7-trimethylene-9-isoalloxazineethyl dihydrogen phosphate, 7,8-dimethyl-9-isoalloxazineethyl acetate, 7,8-dimethyl-9-isoalloxazineethyl hydrogen phosphate, 7,8-dimethyl-9-isoalloxazineethyl hydrogen succinate, 6,8-dimethoxy-9-isoalloxazineethyl acetate, 5-methyl-8-isopropyl-9-isoalloxazineethyl dihydrogen phosphate, 6-chloro-7,8-dimethyl-9-isoalloxazineethyl propionate, 5,6,7-trimethyl-9-isoalloxazineethyl acetate, 5,6,7-trimethyl-9-isoalloxazineethyl hydrogen succinate, 5,6,7-trimethyl-9-isoalloxazinepropyl acetate, 6,7,8-trimethyl-9-isoalloxazineethyl dihydrogen phosphate, 6,7,8-trimethyl-9-isoalloxazineethyl hydrogen succinate, 5,7 - dimethyl - 6 - methoxy - 9 - isoalloxazineethyl hydrogen succinate, 5,7,8-trimethyl-6-amino-9-isoalloxazineethyl acetate, 5,6,8-trimethyl-7-amino-9-isoalloxazineethyl acetate, 5,6,7,8-tetramethyl-9-isoalloxazinepropyl acetate, 5,6,7,8-tetramethyl-9-isoalloxazinepropyl hydrogen succinate, 5,6,7 - trimethyl - 8 - methoxy - 9 - isoalloxazineethyl acetate, 6,8-dimethoxy-7-methyl-9-isoalloxazineethyl acetate, 6-methoxy-7,8-dimethyl-9-isoalloxazineethyl acetate, 5,7-dimethyl-6-methoxy-9-isoalloxazineethyl propionate, 5,8-dimethyl-6,7-diethoxy-9-isoalloxazineethyl benzoate, 5,6,8-trimethyl-7-amino-9-isoalloxazinepropyl acetate, 7-isobutyl-9-isoalloxazineethyl acetate, 7-isobutyl-9-isoalloxazineethyl hydrogen succinate, 6-isobutyl-9-isoalloxazineethyl acetate, 8-isobutyl-9-isoalloxazineethyl acetate, 6-isopropyl-8-methyl-9-isoalloxazineethyl acetate, 5-isopropyl-8-methyl-9-isoalloxazineethyl acetate, and the like, including alkali metal and alkaline earth metal salts thereof.

It is to be understood that the invention is not to be limited to the exact details of operation or compounds shown and described herein, as obvious modifications and equivalents will be apparent to one skilled in the art. The invention is therefore to be limited only by the scope of the appended claims.

We claim:

1. Compounds represented by the formula:

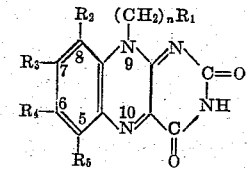

wherein $n$ is an integer from two to six inclusive, $R_1$ is a member selected from the group consisting of (a) an acyloxy radical wherein the acyl group is that of a hydrocarbon carboxylic acid with not more than eighteen carbon atoms; (b) a sulfate radical; and (c) a phosphate radical; $R_3$ and $R_4$ are members selected from the group consisting of hydrogen, lower-alkyl, lower-alkoxy, halo other than fluoro, amino, and a polymethylene group linked to the aromatic ring to form a carbocyclic ring having six carbon atoms, $R_2$ and $R_5$ are members selected from the group consisting of hydrogen, lower-alkyl, lower-alkoxy and amino, and wherein $R_2$, $R_3$, $R_4$ and $R_5$ when taken together include not more than one amino group.

2. Compounds represented by the formula:

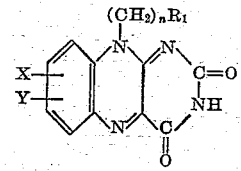

wherein X and Y are lower-alkyl and bear an ortho relationship to each other, $n$ is an integer from two to six inclusive and $R_1$ is an acyloxy radical wherein the acyl group is that of a hydrocarbon carboxylic acid with not more than eighteen carbon atoms.

3. Compounds represented by the formula:

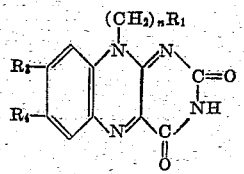

wherein $R_3$ and $R_4$ are lower-alkyl, $n$ is an integer from two to six inclusive and $R_1$ is an acyloxy radical wherein the acyl group is that of a hydrocarbon carboxylic acid with not more than eighteen carbon atoms.

4. Compounds represented by the formula:

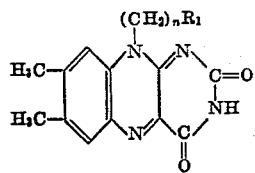

wherein *n* is an integer from two to six inclusive and $R_1$ is an acyloxy radical wherein the acyl group is that of a hydrocarbon carboxylic acid with not more than eighteen carbon atoms.

5. Compounds represented by the formula:

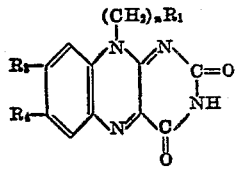

wherein $R_3$ and $R_4$ are lower-alkyl, *n* is an integer from two to six inclusive and $R_1$ is acetoxy.

6. Compounds represented by the formula:

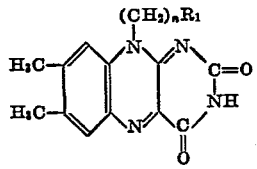

wherein *n* is an integer from two to six inclusive and $R_1$ is acetoxy.

7. 6,7-dimethyl-9-isoalloxazineethyl acetate.

8. An alkali metal salt of a compound represented by the formula:

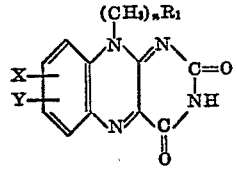

wherein X and Y are lower-alkyl and bear an ortho relationship to each other, *n* is an integer from two to six inclusive, and $R_1$ is an acyloxy radical, that of a hydrocarbon polycarboxylic acid containing not more than eighteen carbon atoms.

9. An alkali metal salt of a compound represented by the formula:

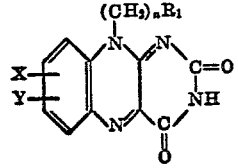

wherein X and Y are lower-alkyl and bear an ortho relationship to each other, *n* is an integer from two to six inclusive, and $R_1$ is the acyloxy radical formed by removal of one of the replaceable hydrogen atoms of succinic acid.

10. An alkali metal salt of a compound represented by the formula:

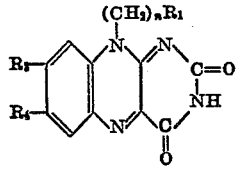

wherein $R_3$ and $R_4$ are lower-alkyl, *n* is an integer from two to six inclusive, and $R_1$ is the acyloxy radical formed by removal of one of the replaceable hydrogen atoms of succinic acid.

11. An alkali metal salt of a compound represented by the formula:

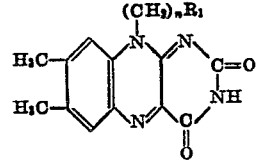

wherein *n* is an integer from two to six inclusive, and $R_1$ is the acyloxy radical formed by removal of one of the replaceable hydrogen atoms of succinic acid.

12. 6,7-dimethyl-9-isoalloxazineethyl hydrogen succinate.

13. Alkali metal salts of 6,7-dimethyl-9-isoalloxazineethyl hydrogen succinate.

14. Sodium 6,7-dimethyl-9-isoalloxazineethyl succinate.

15. Alkali metal salts of 6-ethyl-7-methyl-9-isoalloxazineethyl hydrogen succinate.

16. 6-ethyl-7-methyl-9-isoalloxazineethyl hydrogen succinate.

17. Sodium 6-ethyl-7-methyl-9-isoalloxazineethyl succinate.

References Cited in the file of this patent

UNITED STATES PATENTS 2,111,441     Kuhn et al.     Mar. 15, 1938

UNITED STATES PATENT OFFICE
CERTIFICATE OF CORRECTION

Patent No. 2,825,729                        March 4, 1958

Harold G. Petering et al.

It is hereby certified that error appears in the printed specification of the above numbered patent requiring correction and that the said Letters Patent should read as corrected below.

Column 4, line 34, for "polyhydroxyalkylinoalloxazine" read -- polyhydroxyalkylisoalloxazine --; column 8, line 71, for "8-isobutyl" read -- 6-isobutyl --.

Signed and sealed this 13th day of January 1959.

(SEAL)
Attest:

KARL H. AXLINE
Attesting Officer

ROBERT C. WATSON
Commissioner of Patents